United States Patent [19]
Houk

[11] 3,885,770
[45] May 27, 1975

[54] TRANSMISSION ASSEMBLY

[75] Inventor: Richard D. Houk, Stow, Ohio

[73] Assignee: Teleflex Incorporated, North Wales, Pa.

[22] Filed: Sept. 24, 1973

[21] Appl. No.: 400,359

[52] U.S. Cl.................. 251/294; 74/501 R; 251/77
[51] Int. Cl........................ F16k 31/44; B60k 31/00
[58] Field of Search ............................... 251/77–83, 251/262, 263, 293, 294, 289, 296, 321, 337; 74/501 R, 506, 89, 89.2, 108

[56] References Cited
UNITED STATES PATENTS

| | | | |
|---|---|---|---|
| 2,185,067 | 12/1939 | Sholes | 251/294 X |
| 2,702,700 | 2/1955 | Burritt | 251/337 X |
| 2,850,258 | 9/1958 | Lazich | 251/77 |
| 3,014,495 | 12/1961 | Lannert et al. | 251/75 X |
| 3,528,523 | 9/1970 | Thorner | 251/294 X |
| 3,757,612 | 9/1973 | Schaefer | 251/294 X |

Primary Examiner—Charles J. Myhre
Assistant Examiner—Ira S. Lazarus
Attorney, Agent, or Firm—McGlynn and Milton

[57] ABSTRACT

A modulator valve control for an automatic transmission to provide an input which determines the shift point at which the transmission changes from one mode to another. The assembly includes a modulator valve having a plunger extending therefrom and into a housing. A motion transmitting remote control is included and comprises a guide means attached to the housing and a flexible motion transmitting core element movably supported by the guide means and connected to a flat leaf spring. The flat leaf spring interconnects the core element and the plunger of the modulator valve for actuating the modulator valve in response to motion of the core element.

8 Claims, 3 Drawing Figures

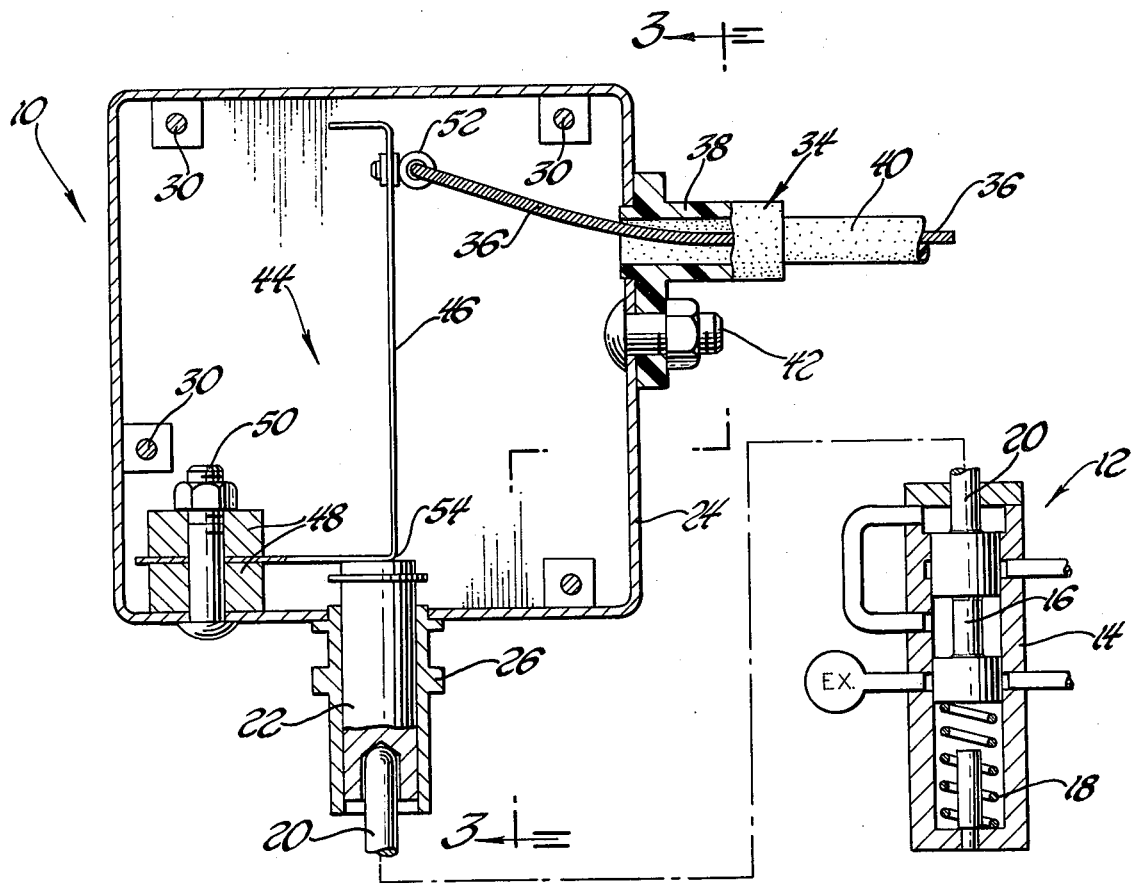
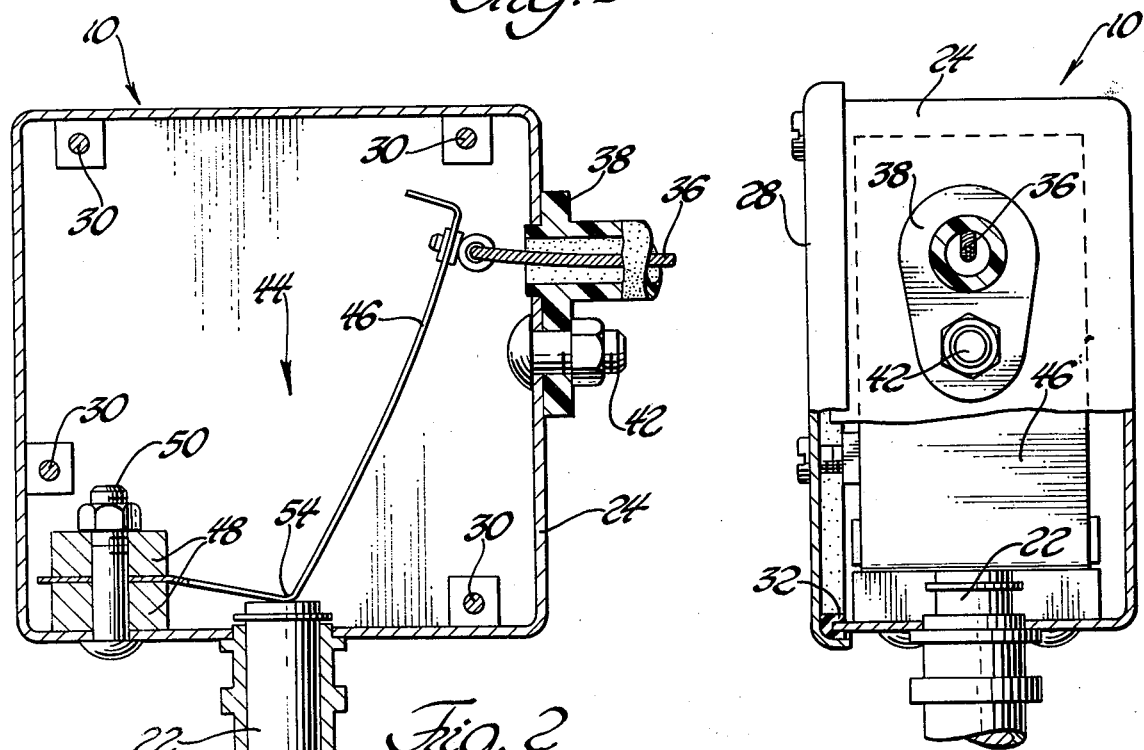

TRANSMISSION ASSEMBLY

The subject invention relates to an automatic transmission of the type utilized in automotive vehicles and more particularly to the type including a modulator valve which receives an input to control or determine a shift point in the automatic transmission, the shift point being the point at which the transmission changes from one mode to another.

In a normal automatic transmission, the transmission automatically shifts in response to various inputs to the transmission. Normally all shifts within the transmission are modulated according to the position of the throttle. This is accomplished through a modulator valve in the transmission which is moved in response to the position of the throttle. Most frequently this is accomplished by making the position of the modulator valve responsive to the engine manifold vacuum which is proportional to the throttle opening.

There are mechanical assemblies utilized to interconnect the modulator valve and the throttle linkage. In one basic system a push-pull remote control system is utilized wherein a movable core element is actuated by the throttle linkage and moves a linear ramp or cam, or the like, which in turn moves a plunger of the modulator valve. In such a system, however, the push-pull control must be capable of transmitting both tension and compression forces, which results in inefficiency, expense and a number of components.

The disadvantages of the push-pull type system have been overcome by a system wherein a flat spiral spring interconnects the core element and the modulator valve with the core element being capable of transmitting tension forces only. Such an assembly is disclosed and claimed in co-pending application Ser. No. 394,358 filed Sept. 4, 1973, pending in the name of Paul H. Kehm and assigned to the assignee of this invention, the instant invention representing an improvement thereover.

In an exemplary automotive set-up the throttle linkage may travel 1 ½ inches while the modulator valve does not move until 12 pounds of force is applied thereto and ends its movement when 16 pounds of force is applied thereto. However, during the first ¾ inch of travel of the throttle linkage there should be no movement of the modulator valve and the force being applied thereto should be building up to 12 pounds so that it reaches 12 pounds when the throttle has moved three quarters of an inch. Thus, there is a requirement for a lost motion between the throttle linkage and the modulator valve. Additionally, when the throttle has reached its full movement a given force, such as 16 pounds in the above example, should be applied to the modulator valve.

Thus, in accordance with the instant invention there is provided a very simple and uncomplex, yet reliable system for interconnecting the throttle linkage and the modulator valve in an automotive vehicle. The improvement represented by the instant invention is accomplished by utilizing a motion transmitting remote control including a guide means movably supporting a core element which need only transmit forces in tension and is connected to the modulator valve through a leaf spring or flexible lever which returns the core element to the initial position after the tension forces are removed therefrom.

Other features and attendant advantages of the present invention will be readily appreciated as the same becomes better understood by reference to the following detailed description when considered in connection with the accompanying drawings wherein:

FIG. 1 is a cross-sectional, fragmentary view of a preferred embodiment of the instant invention;

FIG. 2 is a view similar to FIG. 1 but showing the assembly in an actuated position; and FIG. 3 is a view taken substantially along lines 3—3 of FIG. 1 but partially broken away in the cross-section.

Referring now to the drawings, a transmission assembly constructed in accordance with the instant invention is generally shown at 10.

The transmission assembly includes a modulator valve generally shown at 12. The modulator valve 12 forms a part of the fluid circuit of an automatic transmission and it provides an input to the transmission to control the point at which the transmission shifts from one mode to another. This type of modulator valve and transmission assembly are well known in the art and, therefore, it is not believed necessary to disclose the entire transmission. However, a modulator valve in a transmission fluid circuit is shown in FIG. 13 of an article entitled "New Automatic Transmission for Off-Highway Vehicles" in the April 1973 issue of AUTOMOTIVE ENGINEERING on pages 21 through 28 (volume 81, No. 4).

The modulator valve 12 includes a housing 14, a spool valve 16 and a spring 18. The spool valve 16 controls the fluid flow through various ports extending through the housing 14. A plunger 20 is attached integrally with or rests upon the spool valve 16 for moving the latter. The plunger 20 is disposed in a pocket in a larger plunger or piston 22.

A housing 24 is included and a bushing or sleeve 26 is secured thereto for slidably supporting piston 22. The housing includes a cover or cap 28, which is held in position by the bolt 30. A seal 32 is disposed between the cover 28 in the main portion of the housing 24.

The assembly also includes a motion transmitting remote control, including a guide means generally indicated at 34 and a flexible motion transmitting core element 36. The guide means 34 includes a plastic fitting 38 and a flexible conduit 40. The fitting 38 is secured to the housing 24 by a bolt 42. The conduit 40 is flexible and preferably made of an inner tubular member having filaments or wires helically disposed thereabout on a long lead with an extruded casing disposed about the wires or filaments and the inner tubular member. The conduit 40 extends into the fitting 38 and is secured thereto as by fusion bonding.

Preferably, the core element 36 is of the type which can transmit forces in tension but cannot transmit compression forces as it will buckle. Preferably the core element 36 is a stranded cable but may also take the form of a single wire.

The assembly also includes a flexible lever means generally shown at 44. The lever means 44 includes a flat metal spring or lever 46. One end of the flat metal lever or spring 46 is clamped between blocks 48 by one or more bolts 50, the blocks 48 defining a support. The leaf spring 46 extends in a cantilevered fashion from the support blocks 48 and engages the top of the piston 22 of the modulator valve 12. The flat spring 46 engages the piston 22 of the valve 12 between the support 48 and its connection by the eye bolt 52 to the core element 36. It is to be noted that the core element 36 is connected directly to the leaf spring 46.

The leaf spring of flat spring 46 extends from the support blocks 48 to the piston 22 of the valve 12 where it includes a bend 54 so as to thereafter extend upwardly in another direction. As illustrated, the bend is approximately 90°. However, the bend 54 may be greater than 90° so that the flat spring 46 maintains the core element 36 in tension or always tries to move the core element 36 to the left as viewed in FIG. 1.

In operation, a tension force is applied to the core element 36 to move the core element 36 to the right, as viewed in FIG. 1, whereupon the leaf spring 46 is moved to the position shown in FIG. 2. In accordance with the example above, the spring 46 may be moved toward the position shown in FIG. 2 until the force of 12 pounds is applied to the piston 22. Once the force of 12 pounds is applied to the piston 22, the piston 22 will move the spool 16. Thereafter, continued movement of the spring 46 will move it to the position shown in FIG. 2. Thus, the spring 46 is moved from the neutral position shown in FIG. 1 in response to a tension force being applied to the core element 36, and the spring 46 returns to the neutral position shown in FIG. 1 when the tension force is removed from the core element 36 to return or move the core element to the left, as viewed in FIGS. 1 and 2.

As will be appreciated, the flat spring 46 provides a lost motion between the movement of the core element 36 and the movement of the piston 22 and also provides a mechanical advantage in that the spring 46 is a lever which extends in a cantilevered fashion from the support blocks 48.

It should also be appreciated that the spring 46 need not have a bend 54 therein but may extend straight from a support such as the blocks 48 and across a piston such as that shown at 22.

Thus, the instant invention provides a very simple, uncomplex and economical assembly for controlling the point at which an automatic transmission shifts from one mode to another.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A transmission assembly comprising; a modulator valve, a motion transmitting remote control including guide means and a flexible motion transmitting core element movably supported by said guide means, and a flexible lever means extending in a cantilevered fashion from a support and engaging said valve, said core element being attached to said lever means for actuating said valve upon movement of said core element, said lever means including a flat spring, said spring engaging said valve at a position between said support and the attachment to said core element.

2. An assembly as set forth in claim 1 wherein said spring is moved from a neutral position in response to a tension force being applied to said core element and said spring returns to said neutral position when said tension force is removed from said core element to return said core element.

3. An assembly as set forth in claim 2 wherein said spring extends from said support to said valve and thereafter through a bend and in another direction.

4. An assembly as set forth in claim 3 wherein said bend is approximately 90°.

5. An assembly as set forth in claim 3 wherein said bend is such as to always maintain a force on said core element when in said neutral position.

6. An assembly as set forth in claim 3 including a housing, said support being disposed in said housing, said guide means being attached to said housing, said valve extending into said housing.

7. A transmission assembly comprising a modulator valve, a motion transmitting remote control including guide means and a flexible motion transmitting core element movably supported by said guide means, flat spring means operatively connected to said valve, said core element being connected directly to said spring for actuating said valve through said spring.

8. An assembly as set forth in claim 7 wherein said spring is moved from a neutral position in response to a tension force being applied to said core element and said spring returns to said neutral position when said tension force is received from said core element to return said core element.

* * * * *